3,450,550
INORGANIC BLUE TO GREEN PIGMENTS

Howard Richard Linton, Scotch Plains, N.J., assignor to E. I. du Pont de Nemours and Company, Wilmington, Del., a corporation of Delaware
No Drawing. Filed Feb. 25, 1966, Ser. No. 529,962
Int. Cl. C09c *1/40, 1/36, 1/28*
U.S. Cl. 106—300             4 Claims

---

ABSTRACT OF THE DISCLOSURE

Novel blue to green inorganic pigments prepared by coating pigmentary particles of naturally occurring hydrous aluminum silicate with hydrous titanium dioxide and calcining the coated particles at a temperature of 900–1100° C. in the presence of cobaltous oxide, the pigments being composed of, by weight, 9% to 70% of certain naturally occurring aluminum silicates, 20% to 85% of titanium dioxide and 2% to 28% of cobaltous oxide.

---

This invention relates to new blue to green inorganic pigments and to methods for their preparation. More particularly it relates to new blue to green inorganic pigments which are very fast to light and which, when incorporated in suitable vehicles, yield coating compositions which are highly resistant to change on exposure to the elements and on exposure to elevated temperatures.

Compositions based on cobaltous oxide with either aluminum oxide or titanium oxide yield blue and green pigments respectively, and are well known in the art. In the formation of pastel shades, these pigments are extended with a prime white pigment such as titanium dioxide. Coating compositions of this character change their shade radically on outdoor exposure because of the preferential chalking tendency of the titanium dioxide.

Mixed crystal pigments of cobaltous oxide, aluminum oxide and titanium dioxide are disclosed in Swiss Patent 163,196, dated Oct. 2, 1933, as blue to green pigments. These products, however, lack intensity of color and are relatively weak for their cobalt content. On exposure, coatings containing these products show significant white chalking when the titanium dioxide content is high.

United States Reissue Patent 21,427, Nov. 24, 1936, shows the addition of various coloring oxides, including cobaltous oxide and aluminum oxide to titanium dioxide pigments to produce "self-color chalking" (the chalking is the same color as the pigments) pigments. These products tend to be dull and are extremely weak pastel shades.

Chrest, U. S. Patent 3,079,269, issued on Feb. 26, 1963 discloses oxidic blue to green pigments consisting essentially of a calcined mixture of a cobaltous oxide-providing material, an alumina-providing material and rutile-forming metatitanic acid cake. Although these are claimed to be "self-color chalking" pigments, it has been found they leave much to be desired in this property.

It is an object of this invention to prepare new and improved blue to green pigments which are lightfast, stable to high temperatures and "self-color chalking" in coating compositions while exhibiting pastel shades of relatively high strength.

This is accomplished in the following manner. New blue to green inorganic pigments are prepared by depositing hydrous titanium dioxide on the surface of particles of pigmentary aluminum silicate, preferably in a flake-like form, by the slow thermal hydrolysis of a titanyl sulfate solution and thereafter calcining the coated aluminum silicate in the presence of cobaltous oxide or a compound yielding cobaltous oxide on calcination. These compositions contain 9% to 70% aluminum silicate, 20% to 85% titanium dioxide and 2% to 28% cobaltous oxide with the sum always being 100%. The new pigments resulting have excellent lightfastness and thermal stability. Compositions pigmented with the new pigments show little tendency to chalk on exposure to the elements, and when chalking does occur, it is essentially the same color as the original composition, i.e., it is "self-color chalking."

Broadly the process of this invention comprises three steps:

(1) The surface of an aluminum silicate pigment is coated with hydrous titanium dioxide by suspending the aluminum silicate in a solution of titanyl sulfate from which the hydrous oxide is precipitated by slow thermal hydrolysis whereupon the aluminum silicate particles function as nuclei upon which the hydrous $TiO_2$ deposits;

(2) The resulting aluminum silicate coated with hydrous $TiO_2$ is intimately mixed with a cobaltous oxide producing compound, either by precipitating hydrous cobaltous oxide on the coated pigment or by simple admixture with a suitable cobalt compound which will form the oxide upon calcination;

(3) The resulting mixture is calcined at about 900 to 1100° C.

The color of the final pigment is a function of the relative amounts of the three ingredients. When the thickness of the $TiO_2$ coating is relatively small and especially when the cobaltous oxide content is less than about 25% of the weight of the aluminum silicate, the pigments formed are generally blue presumably because the cobaltous oxide reacts preferentially with the aluminum silicate. On the other hand, when the amount of cobaltous oxide exceeds about 25% of the weight of the aluminum silicate and especially if the $TiO_2$ layer is also thicker, the pigments tend toward the green shade presumably because of the formation of cobalt titanate. There is no sharp demarcation of color between the blue and the green pigments and intermediate shades can be obtained.

The following examples illustrate the invention. All parts and percentages are by weight unless otherwise specified.

EXAMPLE I

Two parts of tetrasodium pyrophosphate is dissolved in 1000 parts of water after which is added, with stirring, 200 parts of a pigmentary hydrous aluminum silicate, sold under the trade name "ASP–170" (Minerals and Chemical Philipp Corp.), which has an average particle size of 0.55 micron. The resulting slurry is heated to 60° C. and 1430 parts of an aqueous titanyl sulfate solution containing 14% $TiO_2$ as titanyl sulfate and with a factor of acidity of 70 (where factor of acidity, a measure of free acid, is $$\frac{100 \text{ (total acid} - \text{combined acid)}}{\text{Combined acid (TiOSO}_4\text{)}}$$

is added. The slurry is brought to a boil and boiled gently for aproximately 2½ hours and then filtered. The filter cake is washed substantially free of sulfate and then dispersed by vigorous stirring in 1000 parts of a 9.52% aqueous solution of cobaltous chloride hexahydrate ($CoCl_2 \cdot 6H_2O$). Sodium hydroxide, in dilute aqueous solution, is added with stirring to give a pH of 8–9, the slurry is filtered and the filter cake is washed substantially free of chloride and then dried. The dry material is calcined at 1050° C. for 1 hour to produce a pigment with a light blue color of good intensity.

EXAMPLE II

Fifty parts of china clay, consisting predominantly of kaolin with an average particle size under 1 micron is slurried in 500 parts of water. The mixture is heated to 60° C. and titanyl sulfate solution, as described in Example I, containing the equivalent of 76.0 parts of $TiO_2$, is added with vigorous stirring. The slurry is heated to the boil for 2½ hours, after which it is filtered and the filter cake washed substantially free of sulfate. The washed filter cake is slurried in a solution of 67.1 parts of cobaltous chloride ($CoCl_2.6H_2O$) in 500 parts of water. An aqueous solution of sodium hydroxide is then added to bring the pH into the range of 8–9 to precipitate the dissolved cobalt salt as the hydrous oxide. The slurry is filtered, the filter cake washed substantially free of chloride and then calcined at 1050° C. for one hour. The calcined product is an attractive green pigment.

EXAMPLE III

One hundred parts of substantially pure hydrous aluminum silicate, in the form of refined kaolin with an average particle size of about 0.5 micron is slurried in a solution of one part of tetrasodium pyrophosphate in 250 parts of water. The slurry is heated to 60° C. with stirring and titanyl sulfate solution, as described in Example I, containing the equivalent of 100 parts of $TiO_2$, is added. The slurry is then heated to the boil and boiled for 2½ hours after which it is filtered. The precipitate is washed free of sulfate and then dispersed in a solution of 48.0 parts of cobaltous sulfate ($CoSO_4.7H_2O$) in 1000 parts of water. The pH is adjusted to 8–9 by the addition of an aqueous sodium hydroxide solution. The solids are isolated by filtration and washing in the conventional manner and calcined at 1050° C. for one hour. The calcined product is an attractive blue-green pigment.

EXAMPLE IV

Fifty parts of a pigmentary refined dickite, consisting substantially of hydrous aluminum silicate, from which extraneous matter has been largely removed, with an average particle size of 0.55 micron, is slurried in 500 parts of water and the slurry heated, with stirring, to 60° C. Titanyl sulfate solution as described in Example I, containing the equivalent of 50 parts of $TiO_2$ is then added with vigorous stirring and the slurry is heated to the boil and boiled for about 2½ hours with refluxing. The slurry is filtered, the solid is washed free of sulfate, and then dispersed in 500 parts of water, containing in solution, 24 parts of cobaltous chloride ($CoCl_2.6H_2O$). The pH is raised to about 9.0 by addition of an aqueous solution of sodium hydroxide with vigorous stirring, and the slurry is filtered. The filter cake is washed substantially free of acid and the washed material is calcined at 1050° C. for one hour to produce a blue colored pigmentary product.

EXAMPLE V

Twenty-five parts of pigmentary hydrous aluminum silicate (as described in Example I) is placed in 750 parts of water and the mixture is heated to 60° C. Titanyl sulfate solution (as described in Example I) containing the equivalent of 150 parts of $TiO_2$ is added during 30 minutes with stirring. The mixture is heated to the boil and boiled for approximately 2½ hours. The slurry is filtered and the filter cake washed substantially sulfate-free and then dispersed in 500 parts of water, containing in solution 48 parts of cobaltous chloride ($CoCl.6H_2O$). The pH is adjusted to about 9.0 by the addition of an aqueous solution of sodium hydroxide. The slurry is filtered, the precipitate is washed free of chloride, and then calcined at 950° C. for one hour. An attractive green pigment of yellowish hue is obtained. Yield of the calcined product is approximately 185 parts.

The following table summarizes the weight percent composition of the three ingredients in the final products of the examples above together with the resulting color. The table also adds a number of examples, it being understood that they are made essentially as in Example I except for suitable modifications in the amounts of ingredients to give the indicated weight per cent compositions.

| Example | Al silicate | $TiO_2$ | CoO | Color |
|---|---|---|---|---|
| 1 | 46.5 | 46.5 | 7.0 | Blue. |
| 2 | 34.0 | 51.6 | 14.4 | Green. |
| 3 | 47.0 | 47.0 | 6.0 | Blue. |
| 4 | 46.5 | 46.5 | 7.0 | Do. |
| 5 | 13.1 | 79.0 | 7.9 | Green. |
| 6 | 67.0 | 26.2 | 6.8 | Blue. |
| 7 | 61.0 | 23.7 | 15.3 | Blue green. |
| 8 | 53.0 | 20.4 | 26.6 | Green. |
| 9 | 57.0 | 32.5 | 10.5 | Blue. |
| 10 | 52.0 | 29.0 | 19.0 | Greenish blue. |
| 11 | 36.5 | 36.5 | 27.0 | Green. |
| 12 | 31.0 | 64.4 | 4.6 | Pale blue. |
| 13 | 26.0 | 54.0 | 20.0 | Green. |
| 14 | 10.2 | 82.0 | 7.8 | Do. |
| 15 | 9.4 | 76.0 | 14.6 | Do. |

An essential ingredient of the new pigments is the aluminum silicate used as the substratum for coating with hydrous titanium dioxide. For optimum color of the final products, a hydrous aluminum silicate is used which should be substantially free from extraneous ions such as iron, chromium and the like which form colored compounds on calcination in the presence of $TiO_2$. The presence of more than minor proportions of such ions leads to color impairment and/or poor color control. Refined forms of naturally occuring hydrated aluminum silicates, all of which occur in a desirable hexagonal plate-like form, include the kaolin class of minerals such as kaolinite, china clay, dickite, nacrite, and halloysite and are convenient sources of the substrate for the process of this invention. In general, it is preferred to use a selected particle size fraction, the optimum size varying with the end use of the pigment. For use in conventional paints and the like, particles below about 1 micron in size are preferred whereas larger sizes are useful for incorporation into thick plastic films and the like. Aluminum silicate pigments which have proved to be especially useful in the process of this invention are flat, plate-like particles which have an average particle size of about 0.55 micron, a specific surface of 12–14 square meters per gram, exhibit a residue on a 325 mesh screen of not more than about 0.01% by weight and have a typical analysis by weight of 45.4% silicon (as $SiO_2$) and 38.8% aluminum (as $Al_2O_3$), the remainder being mostly water with only trace amounts of iron or other coloring ions. Commercial products of this type include a series of aluminum silicate pigments marketed by the Minerals and Chemicals Philipp Corp. under the trade name "ASP–170."

The particle size and shape of the hydrous aluminum silicate substratum largely determines the particle size and shape of the final product. It is not believed that the plate-like character of the particles is essential to the success of the invention. Nevertheless, it is a desirable crystal habit which tends to enhance the protective qualities of the pigments.

Certain minerals, which are chemically related to the desired hydrous aluminum silicate pigments, have limited usefulness as substrates in this invention. For instance, magnesium aluminum silicate (attapulgite) although it may be coated with $TiO_2$, seems to be non-reactive with cobaltous oxide and does not yield the desired blue pigment regardless of amount used. It will, however, permit reaction of the cobaltous oxide with the $TiO_2$ to form a green pigment.

The titanium dioxide is also an essential part of the composite pigment and it is essential that at least the major portion of it be present as a thin adherent layer on the surface of the particles of aluminum silicate pigment. Its presence in this form is brought about by the method of deposition wherein the flake aluminum silicate pigment is suspended in a dilute aqueous acidic solution of a titanium salt, preferably titanyl sulfate, and the hydrous titanium dioxide is precipitated by slow thermal hydrolysis (heating at or near the boiling temperature) so that the aluminum silicate particles provide the nuclei for the deposition of the hydrous titanium dioxide.

The titanyl sulfate used in the preferred process may be obtained in any convenient manner. Thus, a hydrous titanium oxide precipitate, commonly obtained as an intermediate in the preparation of TiO$_2$ pigment, may be dissolved in strong sulfuric acid to give a relatively pure solution of titanyl sulfate. However, such highly pure solutions are not essential and entirely acceptable results can be obtained by using a conventional titanyl sulfate concentrate prepared from ilmenite ore, for instance, and containing a small amount of iron maintained in the divalent state by the presence of a small amount of trivalent titanium in the acidic solution. The concentration of the titanyl sulfate may vary widely, say from about 2 parts (calculated as TiO$_2$) to about 20 parts per 100 parts of solution. In order to prevent precipitation of hydrous titanium oxide at room temperature, it is required that there be an excess of free acid in the solution at all time over and above that necessary to convert all of the titanium oxide to TiOSO$_4$. It is conventional to use a "factor of acidity" (FA) as a parameter to define this relation where:

$$FA = \frac{100 \text{ (total acid} - \text{combined acid)}}{\text{combined acid (TiOSO}_4\text{)}}$$

In the examples, titanyl sulfate solution with a FA value of 70 is used but the value may vary from 50 to 300 for good results. The critical condition is that there be sufficient acid to prevent hydrolysis at room temperature but not enough to repress hydrolysis excessively at elevated temperatures. In general, the preferred FA values are within the range commonly used for the preparation of pigment grade TiO$_2$. Regardless of the source of titanyl sulfate and regardless of its concentration in the solution used, it is preferred that the concentration of titanium salt (calculated as TiO$_2$) in the solution in which the aluminum silicate is suspended at the point of precipitation by hydrolysis be at least about 2 parts and should not exceed about 7 parts per 100 parts of solution. Concentrations less than about 2 parts per 100 parts of solution result in uneconomical operation and concentrations above about 7 parts per 100 parts of solution result in a pronounced tendency for the formation of TiO$_2$ which is not deposited on the particles of the substrate.

The coating layer as described above is particulate in character but extremely adherent so that there is a minimum of free TiO$_2$ even after calcination. The amount of titanium dioxide in the pigment can vary widely as shown in the examples above. Satisfactory pigments have been made containing as little as 20% by weight of the total pigment as TiO$_2$ and other pigments have contained up to about 85% by weight TiO$_2$.

It is obvious that hydrous titanium dioxide may be prepared in other ways, such as by hydrolysis of TiCl$_4$ solutions or hydrolysis of titanium esters such as tetrapropyl titanate.

For the introduction of the cobaltous oxide into the mixture, it is preferred to add a solution of a water soluble cobalt salt (such as cobaltous chloride) to a suspension of aluminum silicate coated with TiO$_2$, which has been washed free of acid. This is followed by precipitation of the hydrous cobaltous oxide by the addition of a solution of an aqueous alkali. However, it is not necessary that the cobaltous oxide be deposited as a coating on the titanium dioxide layer. It may be separately prepared and intimately mixed therewith prior to calcination. Moreover, a suitable cobalt salt such as the carbonate, may be mixed with the aluminum silicate/titanium dioxide and the oxide formed by decomposition during calcination.

In considering the amount of cobalt compound to be used, it should be viewed in terms of the cobaltous oxide it will contribute. Acceptable pigments in the pale blue range have been made with as little as about 2% by weight cobaltous oxide in the mixture and pigments in the green range have contained up to 25% to 28% by weight cobaltous oxide.

To give a complete picture as to the effect of varying the amounts of ingredients, it is, however, necessary to consider the balance of all three ingredients needed to obtain a given desired result. The most intense blue pigments are obtained when the aluminum silicate-titanium dioxide ratio is at least 1:1, and preferably higher, with the cobaltous oxide content well below 10% by weight of the total of the three. On the other hand the most intense green products contain more titanium dioxide than aluminum silicate and the cobaltous oxide content may be as much as 15% by weight of the total.

Still closer inspection of the data suggests that, as a guide but not a rigid rule, the ratio of cobaltous oxide to aluminum silicate largely determines the hue of the pigment. When this ratio exceeds about 1:4, the products tend to be green in hue whereas when this ratio is substantially below 1:4, the products are invariably blue. This rule is less definite when the titanium dioxide content is above about 80% by weight but the tendency to a bluer product with low cobaltous oxide still holds.

The calcium temperature should be close to 1050° C. with variation permitted between about 900° C. and about 1100° C. Below about 900° C., the color forming reaction is not complete. Temperatures above about 1100° C. tend to give objectionably dull green products which are very hard and difficult to disperse in a vehicle.

In these pigments, the colorant, the titanium dioxide and the silicate are combined into one essentially inseparable unit in each particle. Electron micrographs indicate a residual core of unchanged aluminum silicate surrounded by the colored layer with substantially no titanium dioxide unattached to colored material. In contrast, electron micrographs of prior art products show much of the titanium dioxide and colorant as separate entities. The products of this invention are relatively free of titanium dioxide chalking because essentially all of the titanium dioxide is inextricably bound to colorant. When chalking does occur, the chalked pigment has substantially the same color as the unchalked material, whereas free titanium dioxide if present would form a white chalk. Exposure tests have shown real advantage in durability for these new pigments.

The new products of this invention are also characterized by superior color intensity compared to prior art material. Color uniformity throughout the pigment is believed to contribute to the intensity advantage.

Because of the flaky character of our preferred new products, they offer advantages over prior art pigments, which are composed largely of irregular granules. Ability of the particles to form a protective sheath by overlapping of the plate-like particles enhances their protective action in coatings. The process permits variation of morphology and size of the pigment particles by choice of aluminum silicate of suitable characteristics. This is especially important in controlling pigment particle size.

The new pigments of this invention are completely inorganic in nature and made up essentially of chemical combinations of oxides which are quite inert. They offer an unusually high degree of chemical and heat stability including very high alkali resistance which makes them useful in emulsion paints for use on alkali containing masonry surfaces as well as in floor coatings which must be resistant to strong akaline cleaners and high acid resistance enabling their use in polyvinyl acetate paints. Their relatively high heat stability makes them particularly suited for incorporation in plastics which require relatively high molding temperatures. They are also useful in automobile finishes which are baked at high temperatures. The chalk resistance and the self-color of the chalking that does occur makes these particularly useful for exterior paints and for the finishing of prefinished wall coverings such as aluminum siding which is factory coated with long-lived plastic finishes in which the new pigments have been dispersed.

I claim:
1. A process for preparing inorganic blue to green pigments comprising:
   (A) depositing a coating of hydrous titanium dioxide on the surface of pigmentary particles of naturally occurring hydrous aluminum silicate selected from the group consisting of kaolinite, china clay, dickite, nacrite and halloysite, and
   (B) calcining the resulting coated particles at a temperature of 900° to 1100° C. in the presence of cobaltous oxide, said silicate, titanium dioxide and cobaltous oxide being employed in amounts to result in a composition, by weight, of 9 to 70 percent of said naturally occurring silicate, 20 to 85 percent of titanium dioxide and 2 to 28 percent of cobaltous oxide, the sum thereof being 100 percent.

2. A process for preparing inorganic blue to green pigments according to claim 1 in which said pigmentary naturally occurring aluminum siliate is coated with hydrous titanium dioxide by:
   (1) suspending said pigmentary aluminum silicate in a solution of titanyl sulfate, and
   (2) precipitating the hydrous titanium dioxide onto said naturally occurring aluminum silicate pigments by the slow thermal hydrolysis of the titanyl sulfate solution.

3. The process for preparing inorganic blue to green pigments of claim 2 wherein said calcination is carried out at about 1050° C.

4. Inorganic blue to green pigments consisting essentially of:
   (A) a core of pigmentary, naturally occurring, hydrous aluminum silicate, selected from the group consisting of kaolinite, china clay, dickite, nacrite and halloysite, and
   (B) an adherent coating upon said core consisting of an intimate mixture of titanium dioxide and a reaction product resulting from a calcination at 900° to 1100° and selected from the group consisting of (1) the calcination reaction product of cobaltous oxide and aluminum silicate, (2) the calcination reacton product of cobaltous oxide and titanium dioxide, and (3) a mixture of these calcination reaction products, the ingredients of said pigment being present in about the following weight percentages: 9% to 70% of aluminum silicate, 20% to 85% of titanium dioxide, and 2% to 28% of cobaltous oxide, the sum of said ingredients always being 100%.

References Cited

UNITED STATES PATENTS

| | | | |
|---|---|---|---|
| 3,037,876 | 6/1962 | Roseman et al. | 106—299 |
| 3,079,269 | 2/1963 | Chrest et al. | 106—300 |
| 3,087,828 | 4/1963 | Linton | 106—299 |
| 3,378,386 | 4/1968 | Leddy | 106—300 |

TOBIAS E. LEVOW, *Primary Examiner.*

S. E. MOTT, *Assistant Examiner.*

U.S. Cl. X.R.

106—308